US010329009B2

(12) United States Patent
Foster et al.

(10) Patent No.: US 10,329,009 B2
(45) Date of Patent: Jun. 25, 2019

(54) COMPOSITE WING EDGE ATTACHMENT AND METHOD

(71) Applicant: The Boeing Company, Huntington Beach, CA (US)

(72) Inventors: Chris J Foster, Seattle, WA (US); Gregory M Santini, Bothell, WA (US); John V Dovey, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1180 days.

(21) Appl. No.: 14/488,987

(22) Filed: Sep. 17, 2014

(65) Prior Publication Data

US 2016/0244143 A1 Aug. 25, 2016

(51) Int. Cl.
*B64C 3/28* (2006.01)
*B64C 3/26* (2006.01)
*B64F 5/10* (2017.01)

(52) U.S. Cl.
CPC .............. *B64C 3/28* (2013.01); *B64C 3/26* (2013.01); *B64F 5/10* (2017.01)

(58) Field of Classification Search
CPC .... B64C 3/28; B64C 3/26; B64C 1/12; B64D 15/12; B64D 15/14; B64F 5/10
See application file for complete search history.

(56) References Cited

U.S. PATENT DOCUMENTS

| 5,340,280 A | * | 8/1994 | Schilling | .............. | F01D 5/282 |
| | | | | | 416/219 R |
| 2008/0164376 A1 | * | 7/2008 | Kato | ........................ | B64C 3/28 |
| | | | | | 244/132 |

(Continued)

FOREIGN PATENT DOCUMENTS

| EP | 2 457 822 A1 | 5/2012 | | |
| FR | 2936495 A1 | * 4/2010 | ......... | B29C 66/1122 |
| WO | WO2009118548 | 10/2009 | | |

OTHER PUBLICATIONS

Wikipedia, "Pultrusion", https://en.wikipedia.org/wiki/Pultrusion; archived by Internet Archive on Aug. 1, 2013, https://web.archive.org/web/20130801114945/https://en.wikipedia.org/wiki/Pultrusion; accessed Oct. 3, 2017.*
European Patent Office, Munich Germany; Extended European Search Report issued in EP Application No. 15182386.1 dated Mar. 1, 2016.
European Patent Office; European Search Report; European Patent Application No. 15182386.1; dated Mar. 29, 2019.

(Continued)

*Primary Examiner* — Tien Q Dinh
*Assistant Examiner* — Alexander V. Giczy
(74) *Attorney, Agent, or Firm* — Parsons Behle & Latimer (57) ABSTRACT

A composite edge of an aircraft wing includes a composite wing box skin panel, attached to an outward wing spar in an attachment region, and a composite ramp, upon an outer surface of the composite wing box skin panel. The composite wing box skin panel has a proximal end and a distal end, with an overhanging edge, with substantially constant thickness and ply count in the attachment region, the overhanging edge being without any joggle. The composite ramp has a maximum ramp thickness at the distal end, the distal end being set back from the overhanging edge, defining a shoulder, having a relief radius, on the overhanging edge. A composite wing edge skin panel, having a thickness substantially equal to the maximum ramp thickness, is attached to the composite wing box skin panel at the shoulder and adjacent to the distal end of the ramp.

19 Claims, 10 Drawing Sheets

(56) References Cited

U.S. PATENT DOCUMENTS

| | | | |
|---|---|---|---|
| 2010/0077690 A1* | 4/2010 | Durand | B64C 1/12 |
| | | | 52/578 |
| 2010/0327114 A1* | 12/2010 | Iliopoulos | B64C 3/185 |
| | | | 244/123.1 |
| 2011/0095133 A1* | 4/2011 | Stewart | B64C 3/28 |
| | | | 244/123.1 |
| 2011/0271509 A1* | 11/2011 | Willdig | B64C 3/26 |
| | | | 29/428 |
| 2012/0132752 A1* | 5/2012 | Outon Hernández | B64C 3/26 |
| | | | 244/130 |
| 2015/0030380 A1* | 1/2015 | Wilson | B64C 1/12 |
| | | | 403/267 |

OTHER PUBLICATIONS

The State Intellectual Property Office of the People'S Republic of China; Office Action; Chinese Patent Application No. 2015105959508; dated Feb. 28, 2019.

* cited by examiner

COMPOSITE WING EDGE ATTACHMENT AND METHOD

FIELD OF THE DISCLOSURE

The present disclosure relates generally to aircraft wing construction. More particularly, the present disclosure provides a system and method for attachment of the fixed leading and trailing edges of an aircraft wing, particularly a composite wing structure.

BACKGROUND

In recent years, aircraft manufacturers have developed aircraft designs and aircraft fabrication methods that make greater use of carbon fiber composite materials and the like ("composite materials" or "CFCM"), such as graphite/epoxy and carbon fiber reinforced plastic ("CFRP"). Composite materials are significantly lighter than traditional aircraft materials (e.g. aluminum, titanium, steel and alloys of these), and can provide high strength with low weight, allowing lighter, more fuel efficient aircraft. In some newer aircraft, for example, the majority of the primary structure, including the fuselage and wing, is made of composite materials. By volume, some new aircraft can be about 80% composite materials.

Since composite materials have different characteristics than some traditional aircraft materials, new facilities, equipment and handling methods have been developed. This includes fabrication methods for wing structures. A typical wing structure of an aircraft includes one or more main spars, which extend from the root of the wing to the wing tip. These wing spars typically taper from the root to the tip of the wing, and have a plurality of ribs attached along their length. These ribs include interior ribs, located between the main spars, and leading edge and trailing edge ribs. The ribs are oriented generally perpendicularly to the wing spars, and together define an outline that corresponds to the cross-sectional shape of the wing at each rib location.

Attached to the wing ribs are skin panels that provide the finished shape and aerodynamic contour of the wing. The portion of the wing structure from the front main spar to the rear main spar is referred to as the wing box. In composite aircraft, wing skin panels that cover the wing box are typically much thicker than the skin panels for the leading or trailing edges. However, the wing edge skin panels attach to the wing box panels. In the case of aircraft with moveable slats on the leading edges of the wings, a fixed leading edge panel is attached to the wing along the leading edge beneath the slat.

In order to provide a suitable connection and joint for fixed edge skin panels in a composite aircraft wing, a variety of connection methods have been developed. Some existing methods use devices such as splice straps, joggled panels, wiggle plates or secondarily bonded fillers to facilitate this joint. These can be heavy, complex and expensive to make. Some approaches to this issue add extra processing steps in order to ensure the integrity of the joint.

The present disclosure is directed toward one or more of the above issues.

SUMMARY

In accordance with one aspect thereof, the present application discloses a composite edge of an aircraft wing, including a composite wing box skin panel, attached to an outward wing spar in an attachment region, and a composite ramp, upon an outer surface of, and co-cured with, the composite wing box skin panel. The composite wing box skin panel has an overhanging edge, with substantially constant thickness and ply count in the attachment region. The composite ramp has a maximum ramp thickness at a distal end and that is set back from the overhanging edge, defining a shoulder on the overhanging edge. A composite wing edge skin panel, having a thickness substantially equal to the maximum ramp thickness, is attached to the composite wing box skin panel at the shoulder and adjacent to the distal end of the ramp.

In accordance with another aspect thereof, the present application discloses a fixed wing edge connection for a composite aircraft wing, including an integral shoulder, at an edge of a composite wing box skin panel overhanging an outer wing spar in an attachment region, the shoulder defined by an outer surface of the composite wing box skin panel at the edge and a substantially perpendicular thick end of a taper, and a composite wing edge skin panel, attached to the shoulder adjacent to the thick end of the taper. The composite wing box skin panel has a substantially constant thickness and substantially constant ply count in the attachment region, the thick end of the taper being set back from the edge, the taper comprising tapered plies that are co-cured with the outer surface of the wing box skin panel in the attachment region. The composite wing edge skin panel has a thickness that is substantially equal to a thickness of the thick end of the taper.

In accordance with yet another aspect thereof, the present application discloses a method for attaching a fixed edge of a composite aircraft wing. The method includes forming a composite wing box skin panel having a base thickness of substantially constant plies and a thickened edge region of co-cured tapered plies, forming an integral shoulder on the edge region by forming a setback of the co-cured tapered plies, the shoulder having a thickness substantially equal to the base thickness of substantially constant plies, attaching the wing box skin panel to an outward spar of an aircraft wing, with the shoulder outwardly overhanging the outward spar, and attaching a composite wing edge skin panel to the shoulder.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

Figure 1:
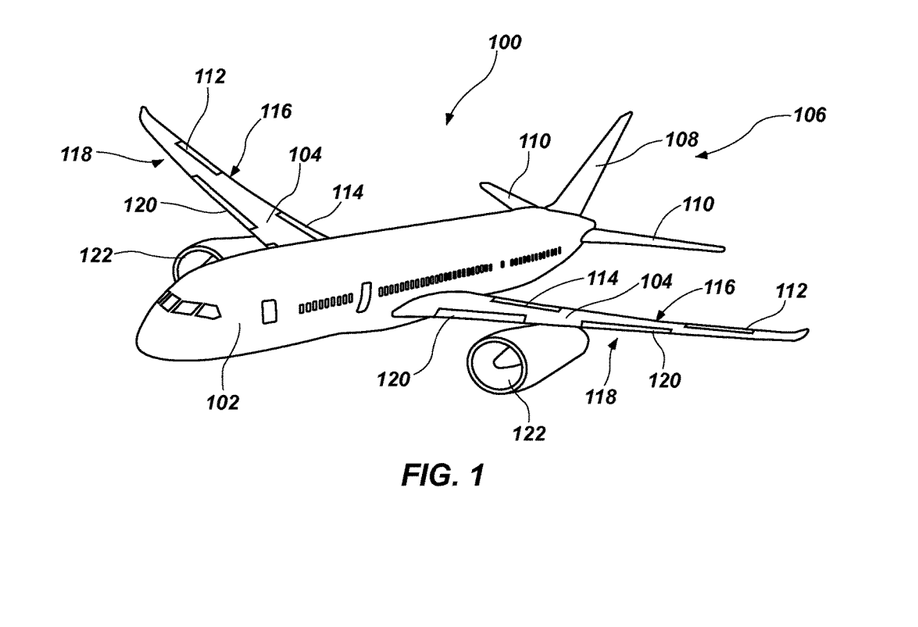
FIG. 1 is a perspective view of an aircraft constructed of composite materials.

Referring to FIG. 1, conventional aircraft 100 typically include a fuselage 102, a wing 104 attached to the fuselage 102, and a tail structure 106 that includes a vertical stabilizer 108 and a horizontal stabilizer 110. The wing can include ailerons 112 and flaps 114 along its trailing edge 116 for assisting with low speed flight, and the leading edge 118 of the wing 104 can include moveable slats 120 for increasing lift during takeoff. The aircraft 100 also includes engines 122, in this case mounted to the wings 104, for providing thrust for flight.

Aircraft like that shown in FIG. 1 have traditionally been constructed using steel, aluminum and other metal materials for the aircraft frame and skin. More recently, however, composite materials and associated construction techniques have been developed that allow the production of aircraft using materials such as carbon fiber composites for large portions of the aircraft frame and skin. Composite materials are strong and lightweight, and allow the construction of aircraft that are substantially lighter than their conventionally-constructed counterparts, providing improvements in efficiency, payload capacity and performance.

Figure 2:
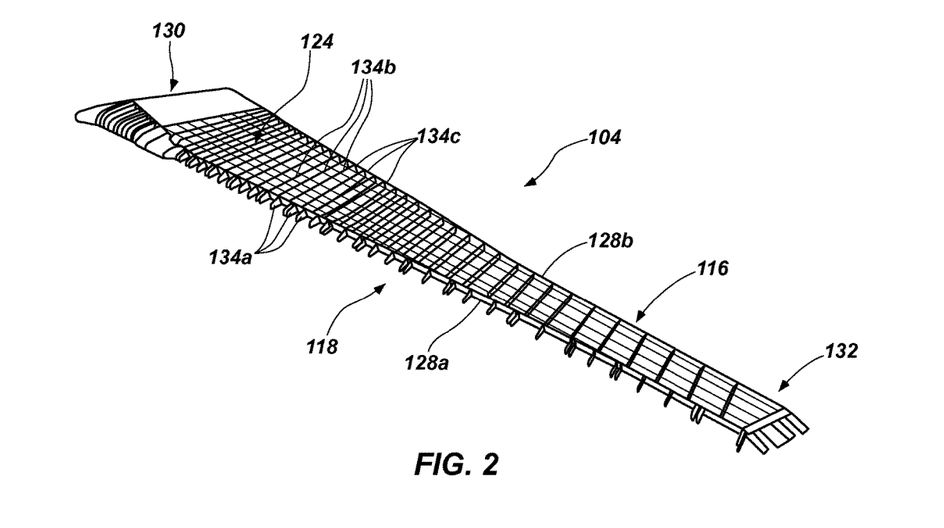
FIG. 2 is a perspective view of a wing of the aircraft of FIG. 1, showing the internal wing structure and the leading and trailing edges.
Figure 4:
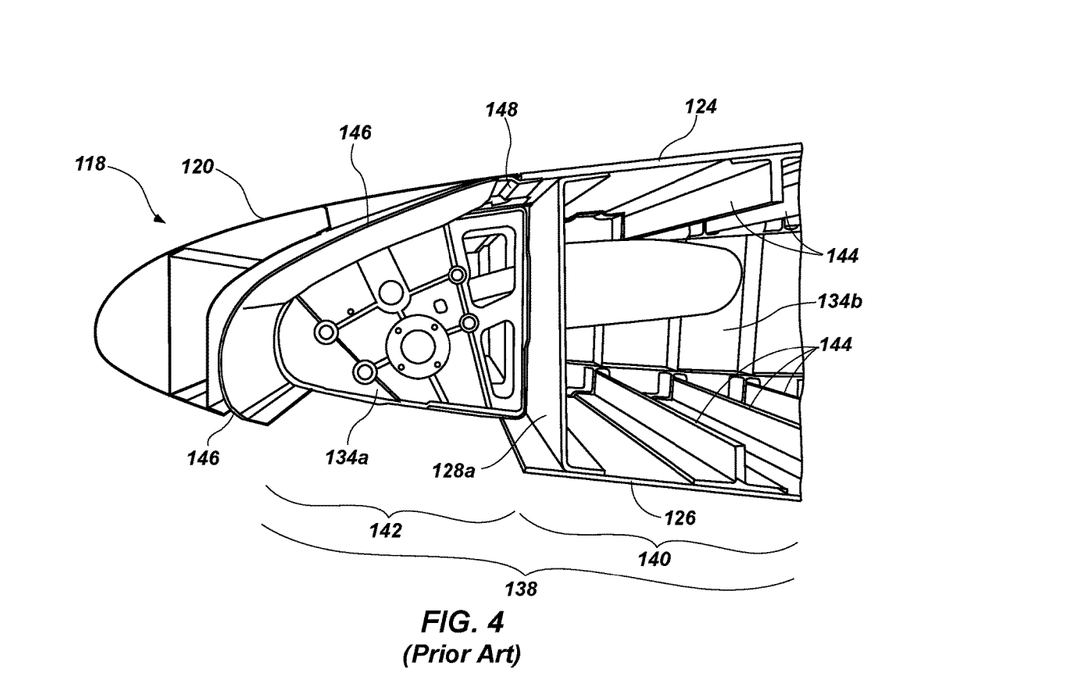
FIG. 4 is a cross-sectional view of a prior art leading edge of a wing of an aircraft having a composite skin construction and a fixed leading edge overlain by a moveable wing slat.

While various aircraft configurations have been used and/or proposed in addition to the configuration shown in FIG. 1, such as multi-wing, multi-fuselage and flying wing configurations, all fixed-wing aircraft include at least one main wing. Shown in FIG. 2 is a perspective view of a wing 104 of the aircraft 100 of FIG. 1. Whether the aircraft is constructed of conventional steel and aluminum parts or composite parts, its structure is generally as shown in FIG. 2. The wing 104 has a leading edge 118 and a trailing edge 116, an upper wing skin 124 and a lower wing skin 126 (FIG. 4). The wing 104 includes one or more main spars, generally 128, which extend generally transversely from the wing root 130, where the spars 128 connect the wing structure to the fuselage (102 in FIG. 1), to the wing tip 132. The wing 104 shown in FIG. 2 includes two main spars 128, a forward main spar 128a closest to the leading edge 118 of the wing, and an aft main spar 128b that is closest to the trailing edge 116 of the wing 104. Connected generally transversely to the wing spars 128 from the leading edge to the trailing of the wing are a series of wing ribs 134. These ribs 134 provide strength to the wing 104 and give the wing its airfoil shape. The wing skin 124,126 is attached directly to the ribs 134, and can also be attached directly to the main spars 128.

Figure 3:
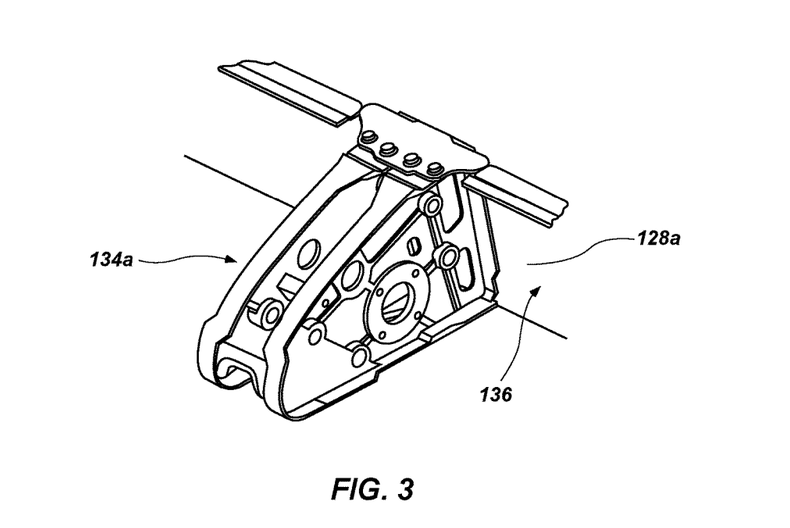
FIG. 3 is a perspective view of a single forward leading edge rib assembly of the wing of FIG. 2.

To provide structural strength to the airframe, the main spars 128 typically are made as tall as possible, and extend from the lower skin 126 to the upper skin 124 of the wing 104. Consequently, the ribs 134 generally comprise multiple pieces, including a leading edge rib portion 134a, one or more interior rib portions 134b, and a trailing edge rib portion 134c. Shown in FIG. 3 is a close-up perspective view of a leading edge rib portion 134a, which is attached along the forward face 136 of the forward main spar 128a, and defines the wing nose shape. A cross-sectional view of a complete leading edge wing assembly is shown in FIG. 4. The view of FIG. 4 is of the leading edge 118 of a wing 104 of composite construction for a relatively large aircraft. The leading edge 118 can be referred to as a composite edge or composite wing edge. The wing 104 generally includes a fixed wing section 138 and a moveable forward wing slat 120. FIG. 4 shows the forward main spar 128a, an interior rib portion 134b and a leading edge rib portion 134a. The fixed wing section 138 can be conceptually divided into the wing box portion 140, which includes the forward main spar 128a and the structure aft of it, and the leading edge portion 142, which includes the structure forward of the forward main spar 128a.

In the wing box portion 140, the wing structure includes the upper composite wing box skin panel 124 and the lower composite wing box skin panel 126 on the top and bottom of the wing 104, respectively. These wing box skin panels 124,126 are attached to the ribs 134 and the main spar 128a, and also to stringers or beams 144 that run generally parallel to the main spar 128a. Forward of the main spar 128a is the leading edge skin panel 146, which curves around the nose of the wing 104, supported by the leading edge rib portion 134a. The leading edge skin panel 146 can include a lightweight honeycomb core, which helps give additional strength to this panel.

As noted above, a composite wing/empennage box panel is typically much thicker than the leading edge panel (or a trailing edge panel) to which it abuts. For example, as can be seen in FIG. 4, the wing box skin panels 124,126 are about ten times thicker than the leading edge skin panel 146. This is because of the greater structural loads that are imposed upon the wing box skin panels 124,126, which form part of the main load-bearing structure of the airframe, and because of the curvature of the leading edge skin panel 146, which naturally increases its strength relative to its thickness.

Figure 5:
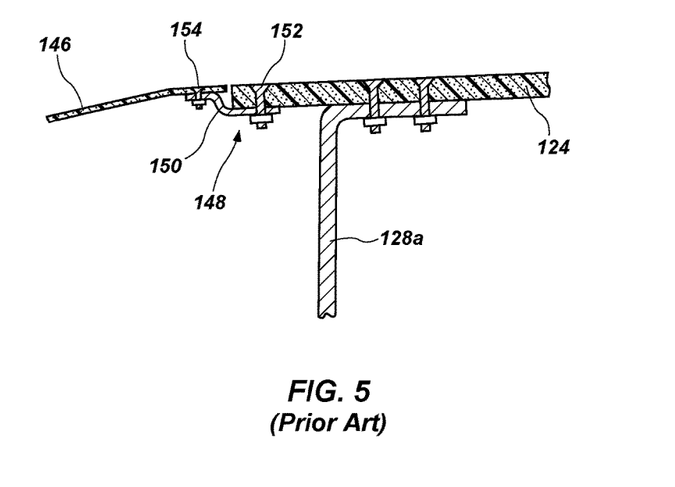
FIG. 5 is a close-up cross-sectional view of a prior art attachment methodology for a fixed leading edge skin panel of a composite wing, at a location away from a forward leading edge rib.

To facilitate the joint between the relatively thin leading (or trailing) edge skin panel 146 and the wing box skin panels 124,126, existing designs use a variety of devices such as splice straps, joggled panels, wiggle plates and secondarily bonded fillers. Shown in FIG. 5 is a close-up cross-sectional view of a prior attachment structure for a fixed leading edge skin panel 146 of a composite wing 104, at a location away from a forward leading edge rib. The wing box skin panel 124 is not connected directly to the wing leading edge skin panel 146. Instead, the wing box skin panel 124 is attached to the forward main spar 128a, and overhangs the spar 128a a certain distance. A splice strap 148, having a jog 150 in it, is attached to the wing box skin panel 124 with fasteners 152, and is also attached to the leading edge skin panel 146 with fasteners 154. The geometry of the splice strap 148 is intended to compensate for the difference in thickness between the wing box skin panel 124 and the leading edge skin panel 146.

The configuration of FIG. 5 has many parts, including the splice strap 148 and the fasteners 152, 154, which potentially add weight to the aircraft (since the splice strap 148 is typically made of metal) and labor for the installation. This configuration can also involve additional labor and the use of shims, etc. during assembly in order to ensure proper alignment of the wing box skin panel 124 and the wing leading edge skin panel 146 and proper aerodynamic fairing of the leading edge slat.

As disclosed herein, a system and method have been developed that reduces the part count for a composite fixed wing edge connection by allowing the panels of the wing/empennage and edges to attach directly to each other. This enables the direct attachment of fixed leading and trailing edge structures to the composite wing and empennage box without the use of splice straps, joggled panels, wiggle plates or secondarily bonded fillers. This reduces the number of parts, weight and cost while reducing the variability of the joint. The reduction in variability can also contribute to reduced shimming and a reduced likelihood of aerodynamic mis-fair for improved performance.

Figure 6:
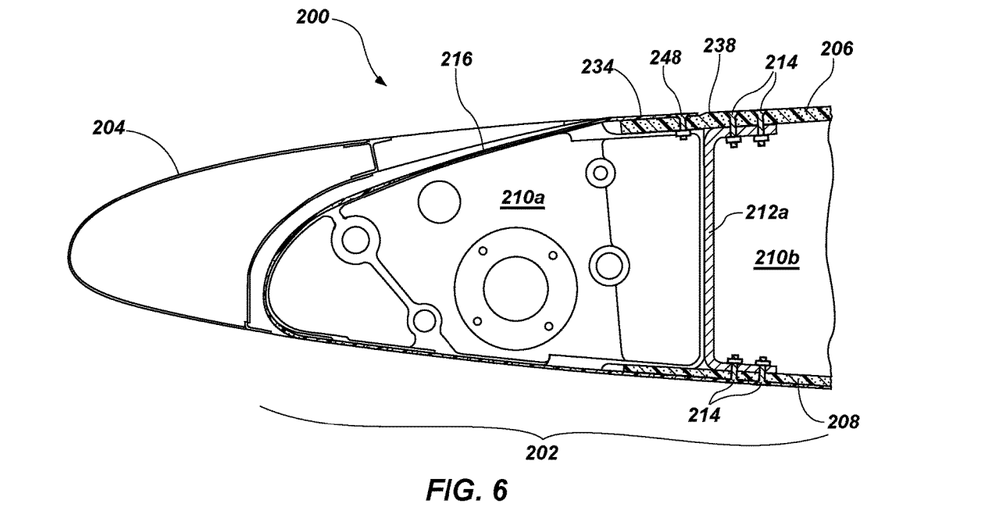
FIG. 6 is a cross-sectional view of a leading edge of a wing of an aircraft having composite construction that incorporates an embodiment of a fixed leading edge attachment in accordance with the present disclosure.
Figure 7:
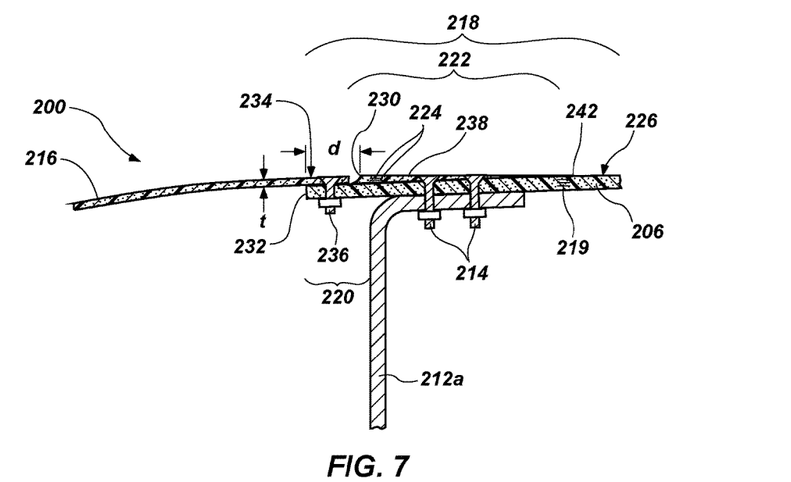
FIG. 7 is a close-up cross-sectional view of the upper fixed leading edge attachment location of FIG. 6.
Figure 8:
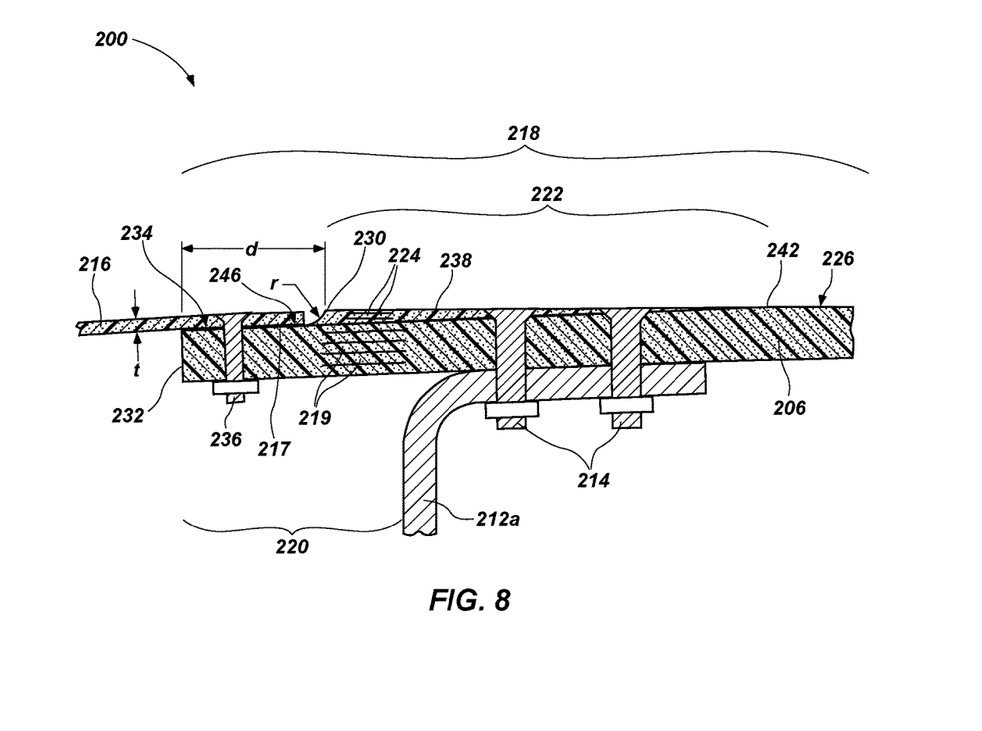
FIG. 8 is a close-up cross-sectional view of the upper fixed leading edge attachment location of FIG. 6, showing the fasteners and other features.

Shown in FIG. 6 is a cross-sectional view of a leading edge of a wing 200 of an aircraft having composite construction (like the aircraft 100 and wing 104 shown in FIGS. 1 and 2), that incorporates an embodiment of a fixed leading edge attachment in accordance with the present disclosure. This leading edge 200 can also be referred to as a composite edge or composite wing edge. Shown in FIG. 7 is a close-up cross-sectional view of this fixed leading edge attachment, and FIG. 8 provides a close-up cross-sectional view of this attachment showing fasteners and other features. The wing 200 generally includes a fixed wing section 202 and a moveable forward wing slat 204, shown in FIG. 6 in its stowed position. The upper and lower composite wing box skin panels 206 and 208, respectively, of the wing 200 are attached to the interior rib portion 210b and the forward main spar 212a with fasteners 214, such as countersunk titanium or steel alloy fasteners. The fixed leading edge skin panel 216, which curves around the nose of the wing 200, is supported by the leading edge rib portion 210a and is also directly attached to the wing box skin panels 206,208 at its proximal end 217. The leading edge skin panel 216 can include a lightweight honeycomb core, which helps give additional strength to this panel.

The composite wing edge skin panel attachment configuration shown herein can be used for either a leading edge or a trailing edge of the wing. In either a leading edge or trailing edge embodiment, the composite wing box skin panels 206,208 are attached to an outward wing spar (i.e. the forward main spar or aft main spar) in an attachment region 218, with an overhanging portion 220. The attachment region 218 is the region of the wing box skin panel 206 that is generally near the outward wing spar 212a, whether fore and aft, including the overhang region 220. While the wing box skin panel 206 can vary in thickness in some regions, it has substantially constant base thickness and ply count in the attachment region 218. In other words, the wing box skin panel 206 has a base thickness of substantially constant plies 219 in the attachment region 218, to maximize the strength of the skin panel in the attachment region.

The overhanging portion 220 includes a thickened edge region 222 of co-cured tapered composite plies 224 on the outer surface 226 of the panel 206. The thickened edge region 222 includes tapered composite plies 224 that are set back at their thick end or distal end 230 from the distal edge 232, which is also an overhanging edge of the wing box skin panel 206, so as to provide an integral shoulder 234, to which the composite wing edge skin panel 216 is directly attached with fasteners 236. The integral shoulder 234 is defined by a composite ramp 238, which has a group of the tapered composite plies 224 that define a thick end 230 that is setback a distance d from the distal edge 232, the tapered composite plies 224 being co-cured upon the outer surface 226 of the composite wing box skin panel 206. These tapered composite plies 224 define a tapered composite ramp 238, which has a proximal end 242 that is flush with the outer surface 226 of the wing box skin panel 206, and a distal end 230 that is set back from the overhanging edge 232 a distance d, with a maximum ramp thickness t at the distal end 230, thereby defining the shoulder 234 on the overhanging edge 232. The composite ramp 238 can have a taper ratio that is in the range of 10:1 to 100:1. In one embodiment, the taper ratio of the ramp is about 40 to 1. That is, where the ramp 238 has a maximum thickness of about 0.13 inches, the ramp portion can have a total length of about 5.2 inches.

The composite ramp 238 being co-cured with the wing box skin panel 206 provides several advantages. Prior methods suggest the use of a secondary applied filler for aerodynamic purposes adjacent to this sort of connection point of an edge panel. However, secondary bonded fillers add processing time and expense compared with a co-cured transition structure. In accordance with the present disclosure, the co-cured non-structural composite material provides this transition ramp 238.

The shoulder 234 can be formed in various ways, including forming, machining and other methods. In one embodiment, forming the integral shoulder 234 is done by laying up the substantially constant plies 219 of the panel 206 and the tapered composite plies 224 against a mandrel (not shown) having the desired shoulder shape. The distal end 230 of the tapered composite plies 224 that are positioned to form the ramp or taper 238 can be placed and held against the mandrel during lay-up and curing of the wing box skin panel 206, so as to form the shoulder 234. That is, a mandrel form having the desired shoulder dimensions can be provided during lay-up and curing of the wing box skin panel 206, so that the distal end 230 of the ramp composite plies 224 begin at the desired shoulder set-back distance from the overhanging edge 232.

Alternatively, the ramp composite plies 224 can extend to the distal edge 232 of the overhanging portion 220 of the wing box skin panel 206, and the shoulder 234 can be formed by machining the overhanging edge 232 of the wing box skin panel 206 (after curing) to remove a portion of the co-cured ramp composite plies 224 and create the shoulder 234. Systems for performing this sort of machining operation on a composite panel are well known by those of skill in the art. The machining step can remove all of the ramp composite plies 224 in the region of the shoulder 234, or after formation of the shoulder 234 some of the ramp composite plies 224 can still extend to the distal edge 232. When the shoulder 234 is machined in a cured skin panel, the proximal end 246 of the shoulder 234 can be provided with a relief radius "r" that helps to reduce stress concentrations where the overall thickness of the skin panel 206 changes. Whether formed or machined, the shoulder 234 is defined by an outer surface 226 of the composite wing box skin panel 206 at the overhanging edge 232 and a substantially perpendicular thick end 230 of the ramp or taper 238, set back from the overhanging edge 232.

The height or thickness t of the shoulder 234 is approximately equal to the thickness of the wing edge skin panel 216. In view of likely variations in wing edge skin panel thicknesses, this thickness t is believed likely to be in the range of 0.08 inches to 0.30 inches. For composite aircraft wings, the wing box skin panel 206 thickness is often about ten times the thickness of the wing edge skin panel 216, though the relative thicknesses of these panels can vary, even in a single aircraft. In general, the wing box skin panel 206 is likely to have a base thickness in the range of 0.5 inch to 1.0 inch, though other dimensions can also be used. In one particular embodiment, the base thickness of the composite wing box skin panel 206 is about one inch, and the thickness of the composite wing edge skin panel 216 is about 0.1 inch. More generally, the fixed edge panel attachment system and method disclosed herein can be used where the thickness of the composite wing box skin panel 206 is from about 3 to about 12 times the thickness of the composite wing edge skin panel 216.

The length or depth of the shoulder 234 can vary, depending on fastener size and other geometric factors. In one embodiment, a shoulder 234 with a thickness of 0.13 inches and a depth d of about 1.6 inches has been used with a wing box skin panel 206 having a thickness of about 0.55 inches. In general, it is believed that the length d of the shoulder 234 can be in the range of 1.0 to 2.0 inches, though other dimensions can also be used.

The composite wing edge skin panel 216 is attached to the composite wing box skin panel 206, e.g. with mechanical fasteners 236, at the shoulder 234 and adjacent to the distal end 230 of the ramp or taper 238. The fasteners 236 can be countersunk metal fasteners of titanium or steel alloy. Any gap between the proximal end 217 of the wing edge skin panel 216 and the distal end 230 of the ramp or taper 238 can be filled by sealant 250. The ramp or taper 238 thus provides a smooth transition profile of the outer wing surface from the edge skin panel 216 to the wing box skin panel 206, while allowing the wing edge skin panel 216 to be directly attached to the wing box skin panel 206, and also allowing the base thickness and plies of the wing box skin panel 206 to be substantially continuous in the attachment region 218. This configuration helps ensure that the outer mold line (OML) of the wing skin 206 and the OML of the leading edge skin 216 will be a closer match—i.e. a flush, smooth aerodynamic surface.

Figure 9A:
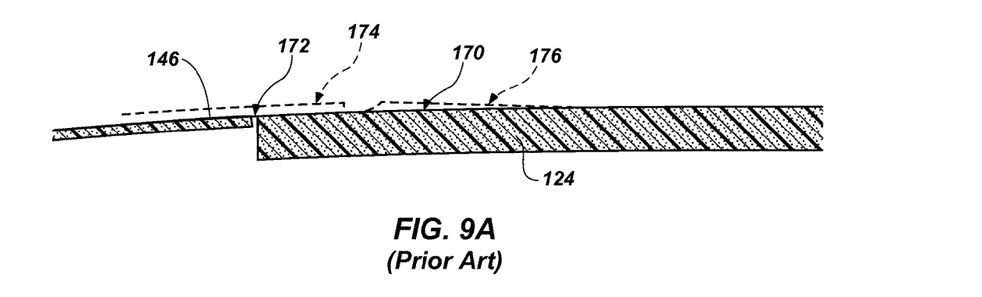
FIG. 9A is a cross-sectional view of a prior art wing box skin panel in abutting alignment with a fixed leading edge skin panel, showing the alignment of the skin profile.
Figure 9B:
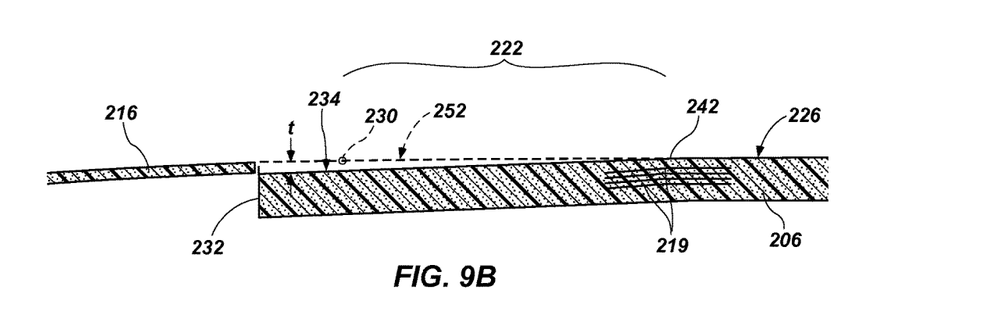
FIG. 9B is a cross-sectional view showing the hypothetical deflection of the distal end portion of a wing box skin panel in order to allow the finished profile of the fixed wing edge attachment disclosed herein to have a profile substantially the same as in the prior art abutting relationship of FIG. 9A.
Figure 9C:
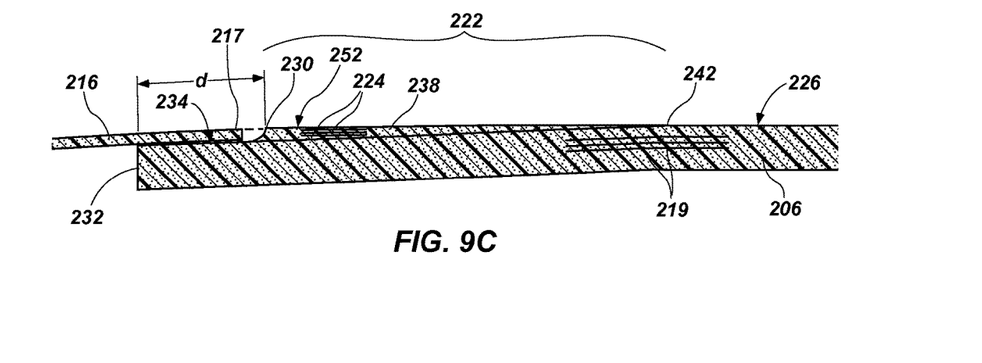
FIG. 9C is a cross-sectional view showing the deflected wing box skin panel with the leading edge skin panel attached and in alignment with the ramp portion.

Another aspect of the wing edge attachment system is suggested by FIG. 8 and illustrated more explicitly in FIGS. 9A-9C. It is desirable that the wing 200 have a smooth aerodynamic profile. As shown in FIG. 9A, the prior wing box skin panel 124 defines a top surface profile 170. Where the adjacent wing edge skin panel 146 is arranged in abutting relationship to the wing box skin panel 124, the two skin panels can have a common alignment at the point of abutment 172, so that the surface profile 170 is continuous and undisturbed. In the new wing edge attachment methodology, however, the overlapping connection of the wing edge skin panel, indicated in dashed lines at 174, and the ramp or taper portion, indicated in dashed lines at 176, potentially present a small disruption of the aerodynamic surface profile 170.

To address this issue, the curvature of the base plies 219 of the wing box skin panel 206 can be adjusted slightly in the region 222 of the ramp or taper 238, as shown in FIGS. 9B and 9C. Specifically, the portion of the outer surface 226 of the composite wing box skin panel 206 that is proximal to the composite ramp 238 (i.e. aft of the thin edge 242 of the taper) can be formed to define the desired standard aerodynamic profile of the wing box skin panel. As shown in FIG. 9B, forward of the thin edge 242 the wing box skin panel 206 is deflected downward (i.e. inward relative to the wing support structure) to define a slight s-curve. This inward curvature deflects the distal edge 232 of the wing box skin panel 206 in the region 222 of the ramp or taper 238 to define an inward s-curvature, which diverges from the standard wing surface profile, indicated in dashed lines at 252, so that the outer surface of the composite ramp 238 defines an outer profile that substantially continues the standard aerodynamic profile of the composite wing box skin panel proximal of the composite ramp. The divergence from the hypothetical skin panel outer surface profile 252 is by the distance t, and provides a distal region of the wing box skin that will become the shoulder 234. In the hypothetical view of FIG. 9B, the thick distal end point 230 of the ramp 238 aligns with the hypothetical skin panel outer surface profile 252.

It is to be appreciated that the configuration shown in FIG. 9B is hypothetical only. In practice, the deflection of the distal edge 232 of the wing box skin panel 206 and the provision of the tapered composite plies 224 to form the ramp 238 are done simultaneously during lay-up and curing of the composite wing box skin panel 206. That is, the form or mandrel that is used for creating the wing box skin panel can be configured with a desired slight deflection adjacent to the leading edge(s) so that the continuous plies 219 are naturally laid-up in the desired deflected shape, with the tapered composite plies 224 placed to form the ramp 238 in a manner that produces the desired outer surface profile 252 of the wing box skin panel 206 when the lay-up is cured. As shown in FIG. 9C, when the wing edge skin panel 216 is ultimately attached to the shoulder 234 adjacent to the thick end 230 of the ramp 238, the entire assembly matches the desired outer surface profile 252, even with the wing edge skin panel 216 attached atop the full thickness wing box skin panel 206.

Figure 10:
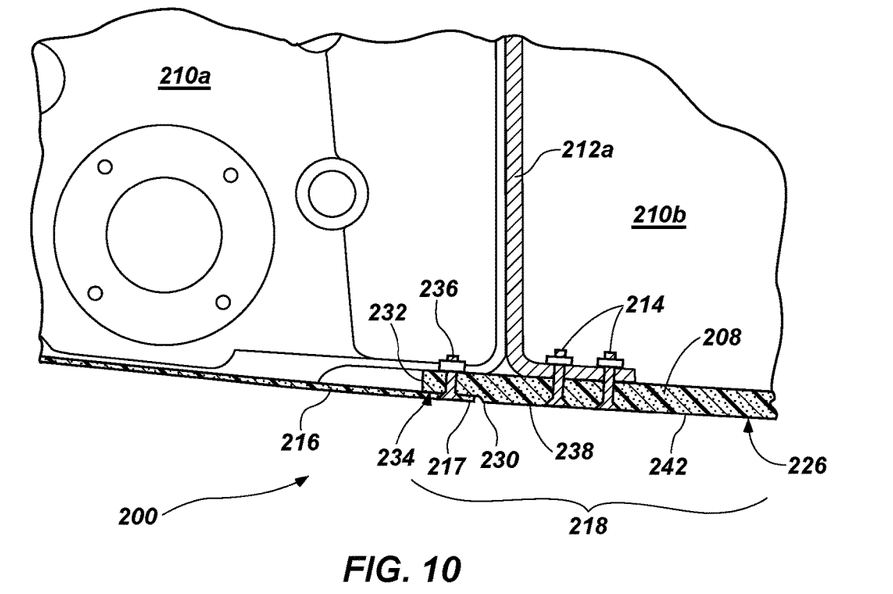
FIG. 10 is a cross-sectional view of an embodiment of a lower fixed leading edge attachment configuration in accordance with the present disclosure.
Figure 11:
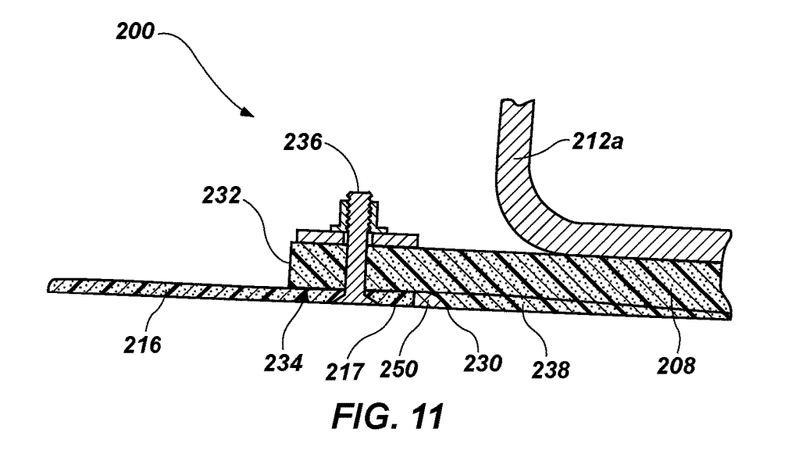
FIG. 11 is a close-up cross-sectional view of one embodiment of a lower fixed leading edge attachment configuration.

While the embodiment of FIGS. 7-8 shows the attachment region at the upper portion of the leading edge, the attachment system and method shown herein can also be used at the lower attachment point of the leading edge. Shown in FIGS. 10 and 11 are cross-sectional views of an embodiment of a lower fixed leading edge attachment configuration in accordance with the present disclosure. As shown, the composite wing box skin panel 208 on the bottom of the wing 200 is attached with fasteners 214 to the interior rib portion 210b and the forward main spar 212a in an attachment region 218, with an overhanging edge 232. The leading edge skin panel 216, which curves around the nose of the wing, is supported by the leading edge rib portion 210a and is directly attached with fasteners 236 to the wing box skin panel 208 at a shoulder 234 of the wing box skin panel 208.

In the attachment region 218 the base portion of the wing box skin panel 208 has substantially constant thickness and ply count. However, the overall thickness of the wing box skin panel 208 varies due to a composite ramp or taper 238 that ends proximally of the overhanging edge 232, creating the integral shoulder 234. As discussed above, the composite ramp 238 is formed of a group of tapered composite plies that are co-cured upon an outer surface 226 of the composite wing box skin panel 208. These tapered composite plies are formed in a tapered ramp 238, which has a proximal end 242 that is flush with the outer surface 226 of the wing box skin panel 208, and a distal end 230 that is set back from the overhanging edge 232, with a maximum ramp thickness at the distal end 230, thereby defining the shoulder 234 on the overhanging edge 232. The height or thickness of this shoulder 234 is approximately equal to the thickness of the wing edge skin panel 216, and the composite wing edge skin panel 216 is attached to the composite wing box skin panel 208 in this the area of the shoulder 234. Any gap between the proximal end 217 of the wing edge skin panel 216 and the distal end 230 of the ramp or taper 238 can be filled by gap filler material 250, so as to provide a smooth aerodynamic transition between the wing box skin panel 208 and the wing edge skin panel 216. The ramp or taper 238 thus helps to provide a smooth transition profile of the outer wing surface from the edge skin panel 216 to the wing box skin panel 208, while allowing the wing edge skin panel 216 to be directly attached to the wing box skin panel 208, and also allowing the base thickness and plies of the wing box skin panel 208 to be substantially continuous in the attachment region 218.

The fixed leading edge attachment system and method disclosed herein can also be applied to leading or trailing edge attachments where removable panels are provided, and this can be done in several ways. Those of skill in the art will appreciate that aircraft can include removable panels in various places for allowing maintenance access to internal structures. The leading edge of a wing often includes several removable panels for allowing access to wing slat actuation mechanisms and other internal parts and systems. Typical fasteners that are used for fixed aircraft skin panels and the panels themselves are not suited to repeated removal and fastening. Thus, special removable fasteners and specially configured panels are used where panels are desired for repeated removal and replacement.

Figure 12:
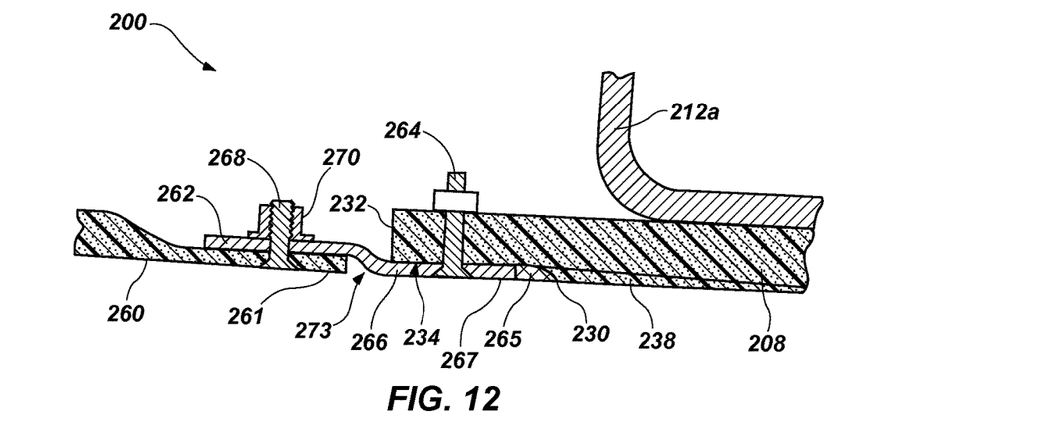
FIG. 12 is a close-up cross-sectional view of another embodiment of a lower fixed leading edge attachment configuration that accommodates a removable panel.

Shown in FIG. 12 is a close-up cross-sectional view of an embodiment of a lower fixed leading edge attachment at a lower spar attachment point that accommodates a removable panel. In this configuration, the wing box skin panel 208 is attached to the forward main spar 212a with an overhanging edge 232. In the attachment zone, the wing box skin panel 208 includes a ramp or taper 238 that increases the overall thickness of the wing box skin panel 208, a distal end 230 of the ramp 238 being set back from the overhanging edge 232, so as to define a shoulder 234, in the manner discussed above.

Where a removable panel that is associated with the fixed leading edge skin panel 216 is involved, this removable panel 260 can be directly attached to a structure other than the wing box skin panel 208 itself. In the embodiment shown in FIG. 12, a splice plate 262 (e.g. of composite or metal) is affixed to the shoulder 234 of the wing box skin panel 208 with a fastener 264. The general dimensions, characteristics and method of forming the shoulder 234 can be as described above. A gap filler material 265, such as sealant can be provided to fill the gap between the distal end 230 of the ramp 238 and the proximal end 267 of the splice plate 262, to provide an aerodynamic surface profile.

The splice plate 262 includes a joggle 266 that is substantially equal to the thickness of the removable composite leading edge skin panel 260. The removable composite leading edge skin panel 260 is attached to the splice plate 262 with a removable fastener 268, such as a countersunk bolt of metal such as titanium or steel alloy. This type of fastener includes a nut plate 270 (e.g. of metal) that is attached to the inside of the splice plate 262. The removable panel 260 can also include a durable sleeve (e.g. of metal) that allows repeated removal and replacement of the fastener 268 without damaging the removable panel 260. Since the removable composite leading edge skin panel 260 is configured for repeated removal and replacement, such as during maintenance activities, gap filler material may not be provided in the gap 273 between the joggle 266 of the splice plate 262, and the proximal end 261 of the removable panel 260. While only an aft edge of the removable panel 260 is shown in FIG. 12, forward and other edges of the removable panel 260 can be configured for attachment in the same way. Other configurations can also be used.

Figure 13:
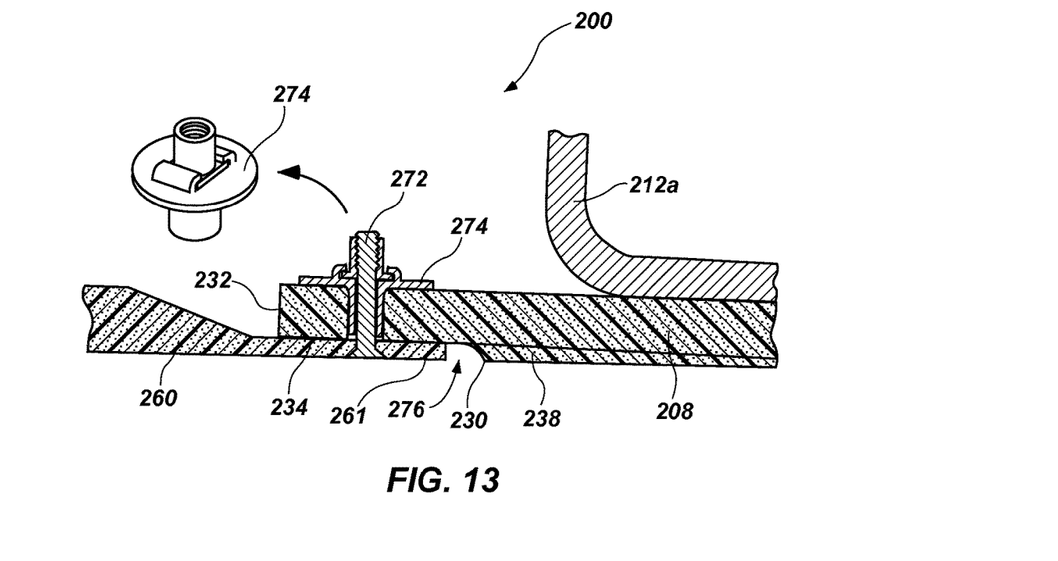
FIG. 13 is a close-up cross-sectional view of another embodiment of a lower fixed leading edge attachment configuration that accommodates a removable panel.

In another embodiment, shown in FIG. 13, the removable panel 260 is directly attached to the shoulder 234 of the wing box skin panel 208. In this embodiment, a removable fastener 272 is provided in the shoulder 234 of the wing box skin panel 208. The removable fastener 272 includes a durable sleeve 274 (e.g. of metal) that extends through the shoulder 234 of the wing box skin panel 208, and engages a floating nut, held by crimped tangs in the base of the sleeve 274, which is bonded or sealed in place to the wing box skin panel 208. The removable panel 260 can also include a durable sleeve (e.g. of metal) that allows repeated removal and replacement of the fastener 272 without damaging the removable panel 260. Since the removable composite leading edge skin panel 260 is configured for repeated removal and replacement, such as during maintenance activities, gap filler material can be provided in the gap 276 between the proximal end 261 of the removable panel 260 and the distal end 230 of the ramp 238 in the shoulder 234, or this gap filler material can be left out.

In FIG. 13, only an aft edge of the removable panel 260 is shown. Since the aft edge of the removable panel 260 is directly attached to the wing box skin panel 208 in this embodiment, other structure can be provided for attachment of the remaining edges (not shown) of the removable panel. For example, a three-quarter frame (not shown) that is configured and functions like the splice plate 262 of FIG. 12 can be provided to encircle the portions of the perimeter of the removable panel 260 that are not adjacent to the edge of the wing box skin panel 208. The removable panel 260 can thus be configured to attach to both the overhanging edge 232 of the wing box skin panel 208 and the three-quarter frame, to fill the combined opening defined by the perimeter frame and the overhanging edge 232 of the wing box skin panel 208.

Figure 14:
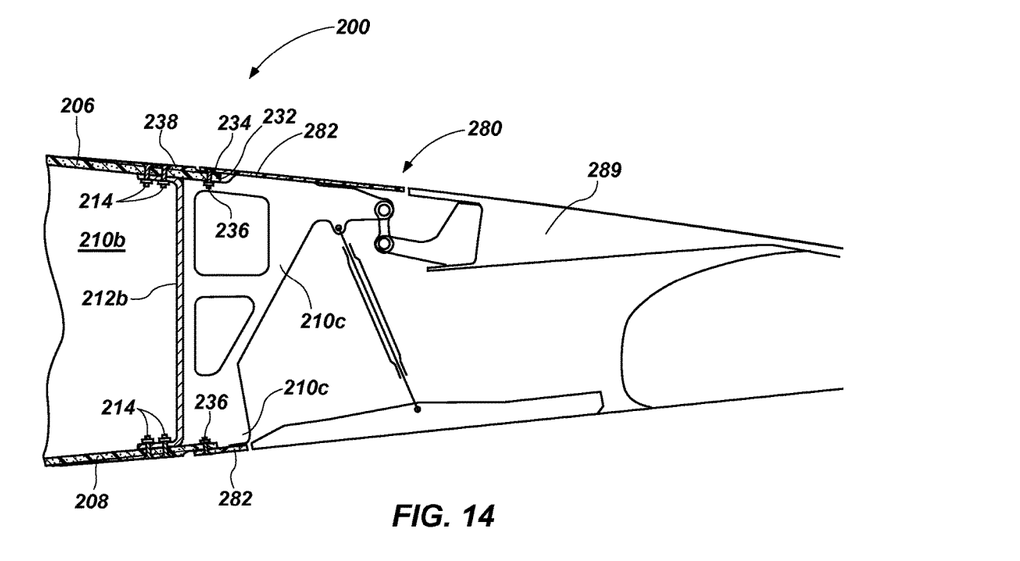
FIG. 14 is a cross-sectional view of a trailing edge of a wing of composite construction, having upper and lower fixed wing edge attachments configured in accordance with the present disclosure.
Figure 15:
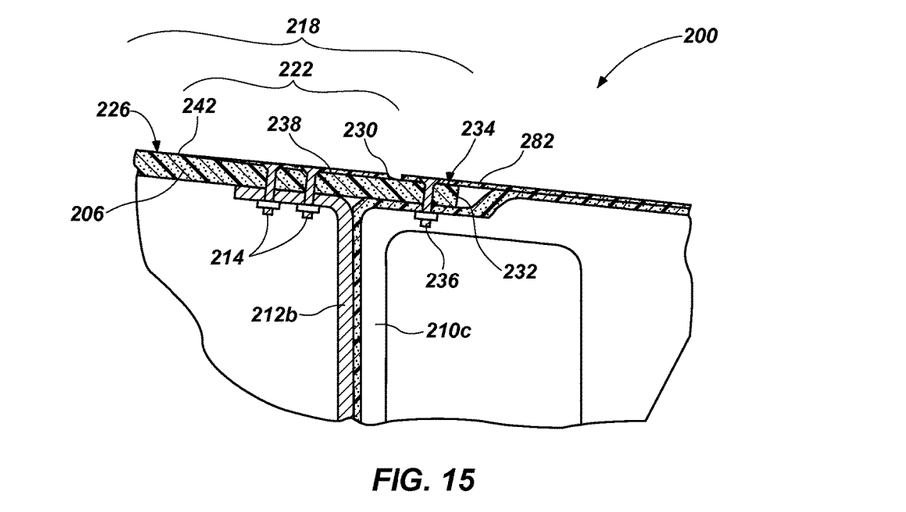
FIG. 15 is a close-up cross-sectional view of an embodiment of an upper fixed trailing edge attachment in accordance with the present disclosure.

As noted above, the system and method of the present disclosure applies equally to leading and trailing edges of aircraft wings. Shown in FIG. 14 is a cross-sectional view of a trailing edge 280 of a wing 200 of composite construction, having upper and lower fixed wing edge attachments configured in accordance with the present disclosure. Provided in FIG. 15 is a close-up cross-sectional view of an upper one of these attachments. As shown, the upper and lower composite wing box skin panels 206, 208, respectively, on the top and bottom, respectively, of the wing 200 are attached to the interior rib portion 210b and the aft main spar 212b in an attachment region, with an overhanging edge 232. Referring to FIG. 15, the upper fixed trailing edge skin panel 282, which is generally planar and extends aft to the base of the wing spoiler (289 in FIG. 14), is supported by a trailing edge rib portion 210c and is directly attached to the wing box skin panel 206 at the shoulder 234 of the wing box skin panel 206, in the manner discussed above.

In the attachment region 218, the base portion of the wing box skin panel 206 has substantially constant thickness and ply count. However, the overall thickness of the wing box skin panel 206 varies due to a composite ramp or taper 238 that ends proximally of the overhanging edge 232, creating the integral shoulder 234. As discussed above, the composite ramp 238 is formed of a group of tapered composite plies that are co-cured upon the outer surface 226 of the composite wing box skin panel 206. These composite plies are formed in a tapered ramp 238, which has a proximal end 242 that is flush with the outer surface 226 of the wing box skin panel 206, and a distal end 230 that is set back from the overhanging edge 232, with a maximum ramp thickness at the distal end 230, thereby defining the shoulder 234 on the overhanging edge 232. This shoulder can be formed or machined, as discussed above, or it can be created in some other way. The height or thickness of the shoulder 234 is approximately equal to the thickness of the composite wing trailing edge skin panel 282, and the panel 282 is attached to the composite wing box skin panel 206 at the shoulder 234. The ramp or taper 238 thus provides a smooth transition profile of the outer wing surface from the wing box skin panel 206 to the wing trailing edge skin panel 282, while allowing the panel 282 to be directly attached to the wing box skin panel 206, and also allowing the base thickness and plies of the wing box skin panel 206 to be substantially continuous in the attachment region 218. A lower attachment point of the trailing edge skin panel can be configured in a similar manner.

This fixed wing edge attachment system and method disclosed herein thus provides a composite wing skin with an integral step along the leading and/or trailing edge. The composite wing includes both parallel and tapered plies, all plies being co-cured for greater strength. The integral step is either machined into the edge of the composite panel or the step is formed by a machined tool or mandrel during lay-up and/or curing of the panel. Advantageously, this connection can be made with only two parts being joined together, as opposed to other prior methods that generally include more than two parts.

The system and method thus provides a wing leading or trailing edge skin-to-wing box skin joint with fewer parts, potentially better tolerances for a flush, smooth aerodynamic surface and potentially better aerodynamic performance. It also provides a cheaper, lighter, more efficient structure that requires less labor to construct. This system and method is believed to differ from prior wing edge skin attachment methods in that the structural plies are tapered in the skin attachment region adjacent to the respective outer main spar, allowing a shallower ramp angle and a shorter overhang from the spar.

Figure 16:
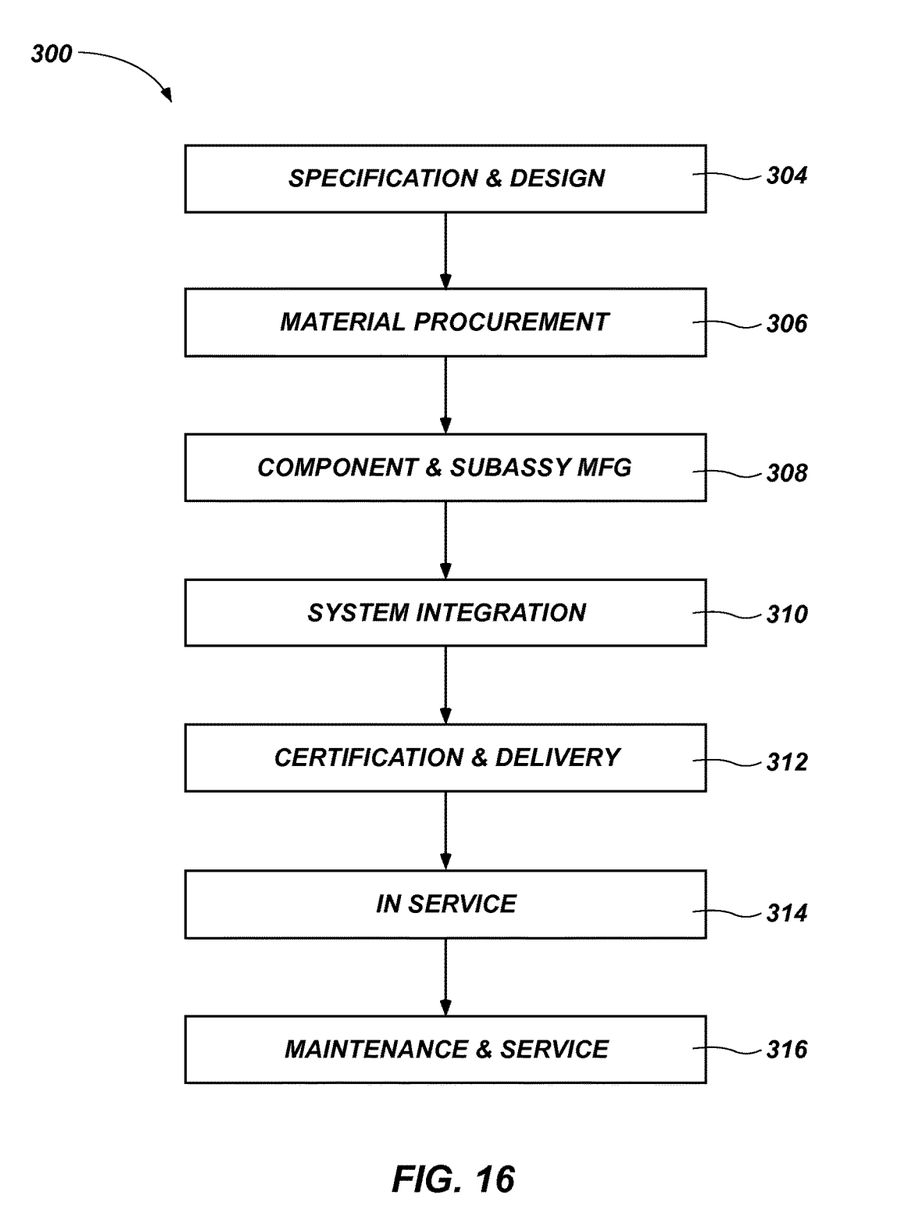
FIG. 16 is a flow diagram of an aircraft production and service methodology.
Figure 17:
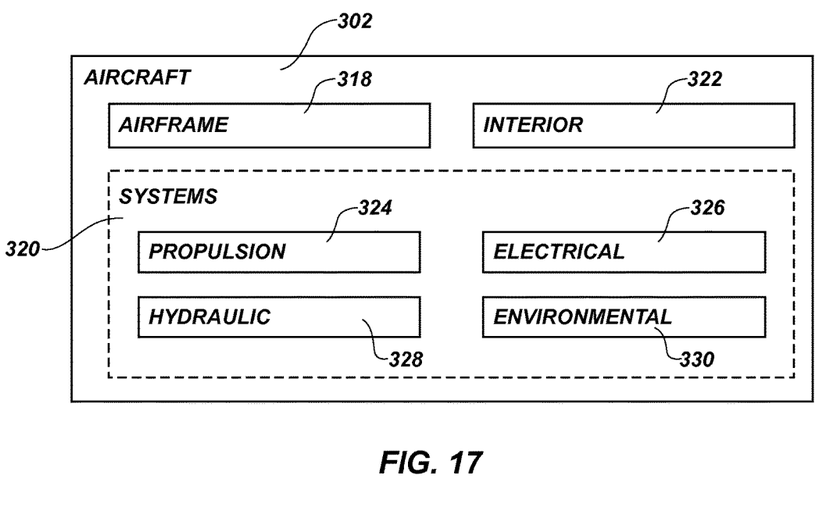
FIG. 17 is a block diagram of an aircraft.

Embodiments of the disclosure may be described in the context of an aircraft manufacturing and service method 300 as shown in FIG. 16, for an aircraft 302 as shown in FIG. 17. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, an aerospace vehicle such as an aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aircraft is given as an example of an aerospace application for the present disclosure, it is to be understood that this is only one example of an aerospace application. Additionally, while an aerospace example is shown, the principles of the disclosure may be applied to other industries, such as the automotive industry, for example.

Although various embodiments have been shown and described, the present disclosure is not so limited and will be understood to include all such modifications and variations are would be apparent to one skilled in the art.

What is claimed is:

1. A composite fixed edge of an aircraft wing, comprising:
   a composite wing box skin panel, attached to an outward wing spar in an attachment region, with an overhanging edge, having a substantially constant thickness and ply count in the attachment region, the overhanging edge being without any joggle; and
   a composite ramp, upon an outer surface of the composite wing box skin panel, having a proximal end and a distal end, the composite ramp being thicker at the distal end than at the proximal end, the distal end being set back from the overhanging edge, defining a shoulder on the overhanging edge, wherein the composite ramp is formed of a plurality of composite plies; and
   a composite wing edge skin panel, having a thickness substantially equal to a maximum thickness of the composite ramp, attached to the composite wing box skin panel at the shoulder and adjacent to the distal end of the composite ramp,
   wherein the shoulder has a relief radius between the shoulder and the outer surface of the composite wing box skin panel.

2. The composite fixed edge of claim 1, wherein the composite wing edge skin panel is a leading edge or a trailing edge of the wing.

3. The composite fixed edge of claim 1, wherein the thickness of the composite wing box skin panel is from 3 to 12 times the thickness of the composite wing edge skin panel.

4. The composite fixed edge of claim 3, wherein the thickness of the composite wing box skin panel is 1 inch, and the thickness of the composite wing edge skin panel is 0.1 inch.

5. The composite fixed edge of claim 1, wherein the attachment region is at a lower spar attachment point, and the composite wing edge skin panel comprises a removable panel.

6. The composite fixed edge of claim 1, wherein the composite ramp has a taper ratio of between 10 to 1 and 100 to 1.

7. The composite fixed edge of claim 1, wherein the distal end of the composite ramp and the shoulder are formed by machining the overhanging edge of the composite wing box skin panel with the composite ramp.

8. The composite fixed edge of claim 1, wherein a portion of the outer surface of the composite wing box skin panel adjacent to the proximal end of the composite ramp defines an aerodynamic profile, and the overhanging edge and a portion of the composite wing box skin panel between the proximal and distal ends of the composite ramp defines an inward curvature, an outer surface of the composite ramp defining an outer profile that substantially continues the aerodynamic profile of the composite wing box skin panel adjacent to the proximal end of the composite ramp.

9. The composite fixed edge of claim 1, wherein the composite wing edge skin panel has a surface that is flush with a surface of the composite ramp.

10. The composite fixed edge of claim 1, wherein the composite ramp has a thickness at the distal end of 0.13 inches and a length of 5.2 inches.

11. The composite fixed edge of claim 1, wherein a gap, comprising the relief radius, between the composite wing edge skin panel and the composite ramp is filled by sealant.

12. A fixed wing edge connection for a composite aircraft wing, comprising:
an integral shoulder, at an edge of a composite wing box skin panel overhanging an outer wing spar in an attachment region, the composite wing box skin panel having a substantially constant thickness and substantially constant ply count in the attachment region and being without joggle in the attachment region, the shoulder defined by an outer surface of the composite wing box skin panel at the edge and a substantially perpendicular thick end of a taper, set back from the edge, the taper comprising plies; and
a composite wing edge skin panel, having a thickness substantially equal to a thickness of the thick end of the taper, attached to the shoulder adjacent to the thick end of the taper,
wherein the shoulder has a relief radius between the shoulder and the outer surface of the composite wing box skin panel.

13. The fixed wing edge connection of claim 12, wherein the thickness of the composite wing box skin panel is from 3 to 12 times the thickness of the composite wing edge skin panel.

14. The fixed wing edge connection of claim 12, wherein the composite wing edge skin panel is a leading edge or a trailing edge of the wing.

15. The fixed wing edge connection of claim 12, wherein the taper has a taper ratio of 40 to 1.

16. The fixed wing edge connection of claim 12, wherein the shoulder is formed by machining the edge of the composite wing box skin panel and the thick end of the taper.

17. The fixed wing edge connection of claim 12, wherein the attachment region is at a lower spar attachment point, and the composite wing edge skin panel comprises a removable panel.

18. The fixed wing edge connection of claim 12, wherein the composite wing edge skin panel has a surface that is flush with a surface of the taper.

19. The fixed wing edge connection of claim 12, wherein a gap, comprising the relief radius, between the composite wing edge skin panel and the taper is filled by sealant.

* * * * *